H. IRWIN.
GRASS CUTTER FOR CUTTING EDGES OF LAWNS AND THE LIKE.
APPLICATION FILED APR. 14, 1910.
1,026,985.
Patented May 21, 1912.
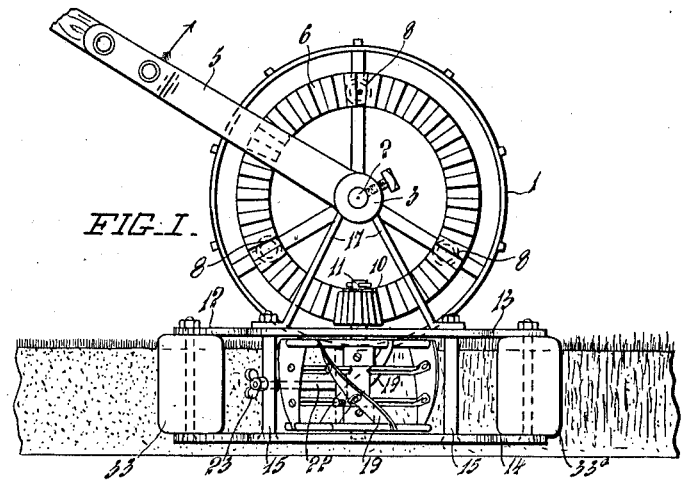
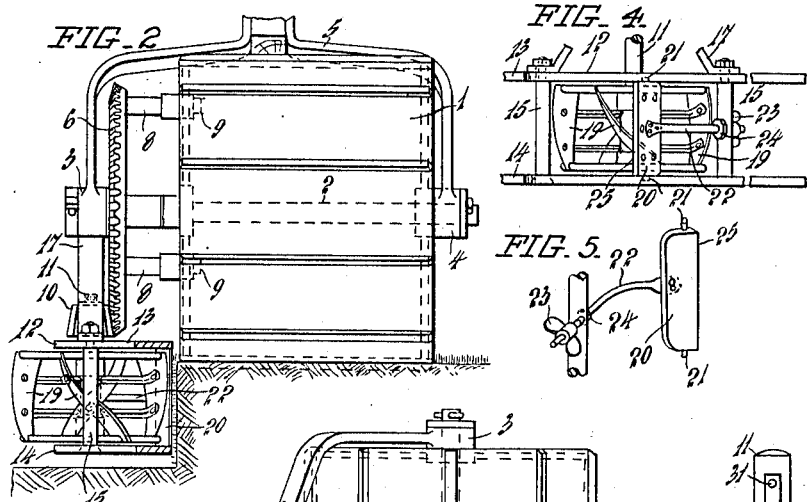
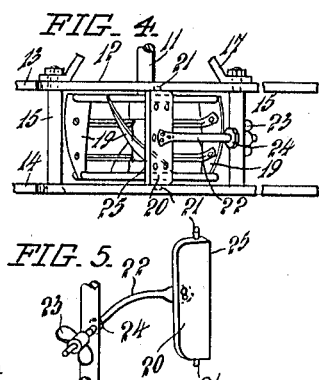
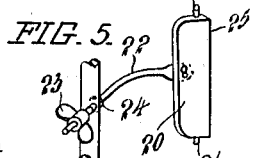
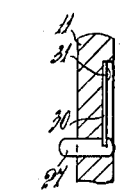
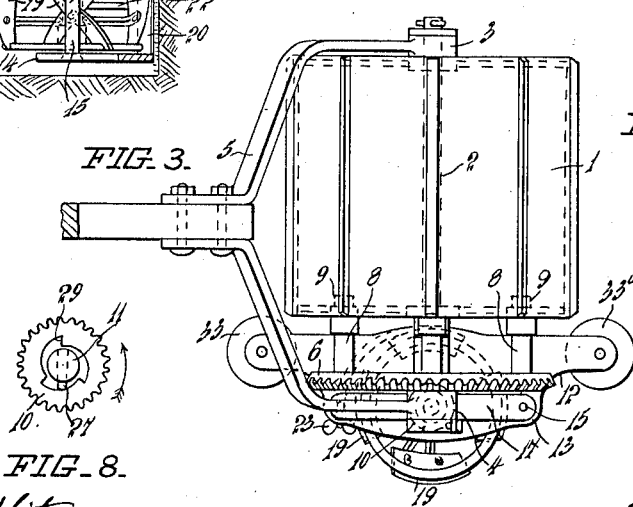
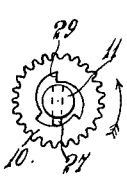

UNITED STATES PATENT OFFICE.

HAROLD IRWIN, OF TIKOKINO, NEW ZEALAND.

GRASS-CUTTER FOR CUTTING EDGES OF LAWNS AND THE LIKE.

1,026,985.     Specification of Letters Patent.     Patented May 21, 1912.

Application filed April 14, 1910. Serial No. 555,360.

*To all whom it may concern:*

Be it known that I, HAROLD IRWIN, a citizen of the Dominion of New Zealand, and residing at Tikokino, in the Provincial District of Hawkes Bay, in the Dominion of New Zealand, have invented certain new and useful Improvements in Improved Grass-Cutters for Cutting Edges of Lawns and the Like, of which the following is a specification.

This invention relates to machines used for cutting grass upon the vertical edges of a lawn or other plot of grass, and the object of the invention is to provide improvements whereby the edges of lawns may be more effectively cut. This object of my invention is obtained by the mechanism illustrated in the accompanying drawing:—

Figure 1, is a side elevation, Fig. 2, a front elevation, and Fig. 3, a plan of the cutter, Fig. 4, is a side elevation of the knives, and Fig. 5, a perspective view of a stationary knife, Fig. 6, is a front elevation, and Fig. 7, a sectional elevation of a pawl in position in a spindle, and Fig. 8, a plan of the interior of a bevel pinion.

A horizontal roller 1 fixed upon an axle 2 is mounted in bearings 3 and 4 integral with a bifurcated handle 5. A bevel wheel 6 secured to the roller 1 by studs 8 and screws 9 gears with a bevel pinion 10 fixed upon a vertical spindle 11, which is adapted to revolve in a frame 12 comprising irregularly shaped cheeks 13 and 14 united together by pillars 15. The frame is connected to the handle 5 by brackets or standards 17.

The spindle 11 carries a plurality of blades or knives 19 for cutting the grass, arranged diagonally in a manner common in lawn mowers, and working in conjunction with a stationary knife 20 mounted upon pintles 21 let into holes in the cheeks 13 and 14, and adjustable in relation to the knives 19. A tailpiece 22 secured to the back of the knife 20 passes through a pillar 15, to which it is fixed by a wing nut 23 and by another nut 24.

When it is desired to bring the cutting edge 25 nearer to the knives 19, the wing nut 23 is slacked back and the nut 24 screwed up as required. As the movement necessary for adjustment is very minute the tail piece 22 springs sufficiently to allow the knife 20 to turn slightly upon its pintles 21 and thereby cause its cutting edge 25 to approach nearer to the blades 19.

The bevel pinion 10 is provided with an internal free wheel arrangement comprising a pawl 27 adapted to slide in a diametrical hole in the spindle 11 and to engage when the pinion is revolved in the direction shown by the arrow in Fig. 8, with one or other of a series of teeth 29 formed in a recess in the pinion. The pawl is normally projected by a spring 30 fixed at one end by a screw 31 to the spindle 11 and having its other end engaged in a slot formed in the pawl. When the pinion is rotated in a contrary direction, that is to say when the whole machine is pulled backward, the pawl rides up the slope of the teeth without rotating the spindle 11.

The roller 1 rides upon the surface of the lawn and frame 12 with its knives overhangs the edge thereof and at a lower level than the roller 1 being guided by rollers 33 and 33ª pivoted in the front and back of the said frame. The rotation of the roller 1 is conveyed to the knives 19 by the bevel wheel 6 and the bevel pinion 10. The cutting of the grass at the edge of the lawn is effected between the knives 19 and the stationary knife 20.

When it is desired to transport the machine from one part of a lawn to another, the handle 5 is turned over, thereby raising the frame 12 clear of the ground and allowing the machine to be run upon its roller 1.

What I do claim and desire to secure by Letters Patent of the United States is:—

1. In a machine for the purpose described, the combination of a roller, a frame in which the roller is mounted, a supplemental frame suspended from the roller supporting frame beyond one end of and extending below the lowest surface of the roller, a vertical shaft mounted in the supplemental frame, gearing connecting said shaft and the roller, and cutting mechanism comprising a blade fixedly mounted in the supplemental frame and a plurality of blades connected with said vertical shaft.

2. In a machine for the purpose described, the combination of a roller, a frame in which the roller is mounted, a handle secured to the frame, said frame being of greater width than the roller, a supplemental frame secured to and depending from the roller supporting frame, a rotatable cutter head mounted in said supplemental frame, to rotate about an axis extending transversely of the axis of the roller and extending below the lowest surface of the roller, and across the space separating the roller and its supporting frame, and a gear supported from the roller in said space between the roller and its frame and adapted to drive the cutter head.

In testimony whereof I have affixed my signature in presence of two witnesses.

HAROLD IRWIN.

Witnesses:
ERNEST SMITH BALDWIN,
JOHN JOSEPH WATSON.

Copies of this patent may be obtained for five cents each, by addressing the "Commissioner of Patents, Washington, D. C."